United States Patent
Frid et al.

(10) Patent No.: US 8,775,843 B2
(45) Date of Patent: *Jul. 8, 2014

(54) POWER MANAGEMENT WITH DYNAMIC FREQUENCY ADJUSTMENTS

(71) Applicant: NVIDIA Corporation, Santa Clara, CA (US)

(72) Inventors: Aleksandr Frid, San Francisco, CA (US); Parthasarathy Sriram, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/758,936

(22) Filed: Feb. 4, 2013

(65) Prior Publication Data

US 2013/0212417 A1 Aug. 15, 2013

Related U.S. Application Data

(63) Continuation of application No. 12/029,375, filed on Feb. 11, 2008, now Pat. No. 8,370,663.

(51) Int. Cl.
*G06F 1/32* (2006.01)

(52) U.S. Cl.
USPC .................. 713/323; 713/310; 713/322

(58) Field of Classification Search
USPC ......................... 713/310, 322, 323
See application file for complete search history.

(56) References Cited

U.S. PATENT DOCUMENTS

| | | | |
|---|---|---|---|
| 4,335,445 A | 6/1982 | Nercessian | |
| 4,544,910 A | 10/1985 | Hoberman | |
| 4,679,130 A | 7/1987 | Moscovici | |
| 4,706,180 A | 11/1987 | Wills | |
| 4,739,252 A | 4/1988 | Malaviya et al. | |
| 4,868,832 A | 9/1989 | Marrington et al. | |
| 4,893,228 A | 1/1990 | Orrick et al. | |
| 5,086,501 A | 2/1992 | DeLuca et al. | |
| 5,103,110 A | 4/1992 | Housworth et al. | |
| 5,167,024 A | 11/1992 | Smith et al. | |

(Continued)

FOREIGN PATENT DOCUMENTS

| | | |
|---|---|---|
| EP | 0381021 | 8/1990 |
| EP | 0474963 | 3/1992 |

(Continued)

OTHER PUBLICATIONS

Govil, K. et al.; "Comparing Algorithms for Dynamic Speed-Setting of a Low-Power PCU"; International Computer Science Institute; Berkeley, CA; Apr. 1995. Cited by other.

(Continued)

*Primary Examiner* — Thuan Du (57) ABSTRACT

A central processing unit (CPU) can specify an initial (e.g., baseline) frequency for a clock signal used by a device to perform a task. The CPU is then placed in a reduced power mode. The device performs the task after the CPU is placed in the reduced power mode until a triggering event causes the device to send an interrupt to the CPU. In response to the interrupt, the CPU awakens to dynamically adjust the clock frequency. If the clock frequency is reset to the baseline value, then the CPU is again placed in the reduced power mode.

20 Claims, 6 Drawing Sheets

(56) References Cited

U.S. PATENT DOCUMENTS

| | | |
|---|---|---|
| 5,177,431 A | 1/1993 | Smith et al. |
| 5,201,059 A | 4/1993 | Nguyen |
| 5,204,863 A | 4/1993 | Saint-Joigny et al. |
| 5,218,704 A | 6/1993 | Watts, Jr. et al. |
| 5,218,705 A | 6/1993 | DeLuca et al. |
| 5,230,055 A | 7/1993 | Katz et al. |
| 5,239,652 A | 8/1993 | Seibert et al. |
| 5,254,878 A | 10/1993 | Olsen |
| 5,300,831 A | 4/1994 | Pham et al. |
| 5,307,003 A | 4/1994 | Fairbanks et al. |
| 5,337,254 A | 8/1994 | Knee et al. |
| 5,339,445 A | 8/1994 | Gasztonyi |
| 5,350,988 A | 9/1994 | Le |
| 5,396,443 A | 3/1995 | Mese et al. |
| 5,410,278 A | 4/1995 | Itoh et al. |
| 5,422,806 A | 6/1995 | Chen et al. |
| 5,440,520 A | 8/1995 | Schutz et al. |
| 5,446,365 A | 8/1995 | Nomura et al. |
| 5,461,266 A | 10/1995 | Koreeda et al. |
| 5,502,838 A | 3/1996 | Kikinis |
| 5,511,203 A | 4/1996 | Wisor et al. |
| 5,513,152 A | 4/1996 | Cabaniss |
| 5,560,020 A | 9/1996 | Nakatani et al. |
| 5,561,692 A | 10/1996 | Maitland et al. |
| 5,568,103 A | 10/1996 | Nakashima et al. |
| 5,568,350 A | 10/1996 | Brown |
| 5,586,308 A | 12/1996 | Hawkins et al. |
| 5,587,672 A | 12/1996 | Ranganathan et al. |
| 5,589,762 A | 12/1996 | Iannuzo |
| 5,590,342 A | 12/1996 | Marisetty |
| 5,592,173 A | 1/1997 | Lau et al. |
| 5,594,360 A | 1/1997 | Wojciechowski |
| 5,630,110 A | 5/1997 | Mote, Jr. |
| 5,648,766 A | 7/1997 | Stengel et al. |
| 5,666,522 A | 9/1997 | Klein |
| 5,675,272 A | 10/1997 | Chu |
| 5,680,359 A | 10/1997 | Jeong |
| 5,682,093 A | 10/1997 | Kivela |
| 5,692,204 A | 11/1997 | Rawson et al. |
| 5,710,929 A | 1/1998 | Fung |
| 5,717,319 A | 2/1998 | Jokinen |
| 5,719,800 A | 2/1998 | Mittal et al. |
| 5,727,208 A | 3/1998 | Brown |
| 5,737,613 A | 4/1998 | Mensch, Jr. |
| 5,742,142 A | 4/1998 | Witt |
| 5,745,375 A | 4/1998 | Reinhardt et al. |
| 5,752,011 A | 5/1998 | Thomas et al. |
| 5,754,869 A | 5/1998 | Holzhammer et al. |
| 5,757,171 A | 5/1998 | Babcock |
| 5,757,172 A | 5/1998 | Hunsdorf et al. |
| 5,760,636 A | 6/1998 | Noble et al. |
| 5,764,110 A | 6/1998 | Ishibashi |
| 5,774,703 A | 6/1998 | Weiss et al. |
| 5,774,704 A | 6/1998 | Williams |
| 5,778,237 A | 7/1998 | Yamamoto et al. |
| 5,787,011 A | 7/1998 | Ko |
| 5,796,313 A | 8/1998 | Eitan |
| 5,812,860 A | 9/1998 | Horden et al. |
| 5,815,724 A | 9/1998 | Mates |
| 5,825,674 A | 10/1998 | Jackson |
| 5,825,972 A | 10/1998 | Brown |
| 5,847,552 A | 12/1998 | Brown |
| 5,848,281 A | 12/1998 | Smalley et al. |
| 5,864,225 A | 1/1999 | Bryson |
| 5,884,049 A | 3/1999 | Atkinson |
| 5,884,068 A | 3/1999 | Conary et al. |
| 5,894,577 A | 4/1999 | MacDonald et al. |
| 5,913,067 A | 6/1999 | Klein |
| 5,923,545 A | 7/1999 | Nguyen |
| 5,926,394 A | 7/1999 | Nguyen et al. |
| 5,933,649 A | 8/1999 | Lim et al. |
| 5,940,785 A | 8/1999 | Georgiou et al. |
| 5,940,786 A | 8/1999 | Steeby |
| 5,952,798 A | 9/1999 | Jones et al. |
| 5,974,557 A | 10/1999 | Thomas et al. |
| 5,977,763 A | 11/1999 | Loughmiller et al. |
| 5,978,926 A | 11/1999 | Ries et al. |
| 5,996,083 A | 11/1999 | Gupta et al. |
| 5,996,084 A | 11/1999 | Watts |
| 6,005,904 A | 12/1999 | Knapp et al. |
| 6,011,403 A | 1/2000 | Gillette |
| 6,023,776 A | 2/2000 | Ozaki |
| 6,025,737 A | 2/2000 | Patel et al. |
| 6,035,357 A | 3/2000 | Sakaki |
| 6,035,407 A | 3/2000 | Gebara et al. |
| 6,040,668 A | 3/2000 | Huynh et al. |
| 6,047,248 A | 4/2000 | Georgiou et al. |
| 6,065,126 A | 5/2000 | Tran et al. |
| 6,065,131 A | 5/2000 | Andrews et al. |
| 6,124,732 A | 9/2000 | Zilic et al. |
| 6,134,167 A | 10/2000 | Atkinson |
| 6,141,762 A | 10/2000 | Nicol et al. |
| 6,163,583 A | 12/2000 | Lin et al. |
| 6,167,524 A | 12/2000 | Goodnow et al. |
| 6,167,529 A | 12/2000 | Dalvi |
| 6,172,943 B1 | 1/2001 | Yuzuki |
| 6,216,234 B1 | 4/2001 | Sager et al. |
| 6,219,795 B1 | 4/2001 | Klein |
| 6,229,747 B1 | 5/2001 | Cho et al. |
| 6,242,936 B1 | 6/2001 | Ho et al. |
| 6,243,656 B1 | 6/2001 | Arai et al. |
| 6,255,974 B1 | 7/2001 | Morizio et al. |
| 6,304,824 B1 | 10/2001 | Bausch et al. |
| 6,310,912 B1 | 10/2001 | Maiocchi et al. |
| 6,311,287 B1 | 10/2001 | Dischler et al. |
| 6,360,327 B1 | 3/2002 | Hobson |
| 6,363,490 B1 | 3/2002 | Senyk |
| 6,366,157 B1 | 4/2002 | Abdesselem et al. |
| 6,369,557 B1 | 4/2002 | Agiman |
| 6,407,571 B1 | 6/2002 | Furuya et al. |
| 6,415,388 B1 | 7/2002 | Browning et al. |
| 6,422,746 B1 | 7/2002 | Weiss et al. |
| 6,425,086 B1 | 7/2002 | Clark et al. |
| 6,426,641 B1 | 7/2002 | Koch et al. |
| 6,448,815 B1 | 9/2002 | Talbot et al. |
| 6,456,049 B2 | 9/2002 | Tsuji |
| 6,457,134 B1 | 9/2002 | Lemke et al. |
| 6,470,289 B1 | 10/2002 | Peters et al. |
| 6,476,632 B1 | 11/2002 | La Rosa et al. |
| 6,484,041 B1 | 11/2002 | Aho et al. |
| 6,489,796 B2 | 12/2002 | Tomishima |
| 6,535,424 B2 | 3/2003 | Le et al. |
| 6,535,986 B1 | 3/2003 | Rosno et al. |
| 6,600,575 B1 | 7/2003 | Kohara |
| 6,621,242 B2 | 9/2003 | Huang et al. |
| 6,630,754 B1 | 10/2003 | Pippin |
| 6,650,074 B1 | 11/2003 | Vyssotski et al. |
| 6,650,740 B1 | 11/2003 | Adamczyk et al. |
| 6,657,504 B1 | 12/2003 | Deal et al. |
| 6,662,775 B2 | 12/2003 | Hauser |
| 6,668,346 B1 | 12/2003 | Schulz et al. |
| 6,674,587 B2 | 1/2004 | Chhabra et al. |
| 6,678,831 B1 | 1/2004 | Mustafa et al. |
| 6,690,219 B2 | 2/2004 | Chuang |
| 6,703,803 B2 | 3/2004 | Ohiwa et al. |
| 6,714,891 B2 | 3/2004 | Dendinger |
| 6,718,496 B1 | 4/2004 | Fukuhisa et al. |
| 6,721,892 B1 | 4/2004 | Osborn et al. |
| 6,737,860 B2 | 5/2004 | Hsu et al. |
| 6,748,408 B1 | 6/2004 | Bredin et al. |
| 6,774,587 B2 | 8/2004 | Makaran et al. |
| 6,792,379 B2 | 9/2004 | Ando |
| 6,794,836 B2 | 9/2004 | Strothmann et al. |
| 6,795,075 B1 | 9/2004 | Streitenberger et al. |
| 6,795,927 B1 | 9/2004 | Altmejd et al. |
| 6,799,134 B2 | 9/2004 | Borchers et al. |
| 6,801,004 B2 | 10/2004 | Frankel et al. |
| 6,804,131 B2 | 10/2004 | Galbiati et al. |
| 6,806,673 B2 | 10/2004 | Ho |
| 6,815,938 B2 | 11/2004 | Horimoto |
| 6,815,971 B2 | 11/2004 | Wang et al. |
| 6,831,448 B2 | 12/2004 | Ishii et al. |
| 6,836,849 B2 | 12/2004 | Brock et al. |
| 6,837,063 B1 | 1/2005 | Hood, III et al. |

(56) References Cited

U.S. PATENT DOCUMENTS

| | | | |
|---|---|---|---|
| 6,853,259 B2 | 2/2005 | Norman et al. | |
| 6,853,569 B2 | 2/2005 | Cheng et al. | |
| 6,885,233 B2 | 4/2005 | Huard et al. | |
| 6,889,331 B2 | 5/2005 | Soerensen et al. | |
| 6,889,332 B2 | 5/2005 | Helms et al. | |
| 6,914,492 B2 | 7/2005 | Hui et al. | |
| 6,938,176 B1 | 8/2005 | Alben et al. | |
| 6,947,865 B1 | 9/2005 | Mimberg et al. | |
| 6,970,798 B1 | 11/2005 | Cao et al. | |
| 6,975,087 B1 | 12/2005 | Crabill et al. | |
| 6,976,112 B2 | 12/2005 | Franke et al. | |
| 6,987,370 B2 | 1/2006 | Chheda et al. | |
| 6,990,594 B2 | 1/2006 | Kim | |
| 7,003,421 B1 | 2/2006 | Allen, III et al. | |
| 7,005,894 B2 | 2/2006 | Weder | |
| 7,042,296 B2 | 5/2006 | Hui et al. | |
| 7,043,649 B2 | 5/2006 | Terrell, II | |
| 7,045,993 B1 | 5/2006 | Tomiyoshi | |
| 7,051,215 B2 | 5/2006 | Zimmer et al. | |
| 7,068,557 B2 | 6/2006 | Norman et al. | |
| 7,071,640 B2 | 7/2006 | Kurosawa et al. | |
| 7,080,271 B2 * | 7/2006 | Kardach et al. | 713/323 |
| 7,100,061 B2 | 8/2006 | Halepete et al. | |
| 7,112,978 B1 | 9/2006 | Koniaris et al. | |
| 7,119,522 B1 | 10/2006 | Tomiyoshi | |
| 7,122,978 B2 | 10/2006 | Nakanishi et al. | |
| 7,129,745 B2 | 10/2006 | Lewis et al. | |
| 7,149,909 B2 | 12/2006 | Cui et al. | |
| 7,180,322 B1 | 2/2007 | Koniaris et al. | |
| 7,256,571 B1 | 8/2007 | Mimberg et al. | |
| 7,256,788 B1 | 8/2007 | Luu et al. | |
| 7,334,198 B2 | 2/2008 | Ditzel et al. | |
| 7,336,090 B1 | 2/2008 | Koniaris et al. | |
| 7,336,092 B1 | 2/2008 | Koniaris et al. | |
| 7,348,827 B2 | 3/2008 | Rahim et al. | |
| 7,348,836 B2 | 3/2008 | Velmurugan | |
| 7,363,176 B2 | 4/2008 | Patel et al. | |
| 7,409,570 B2 | 8/2008 | Suzuoki | |
| 7,414,450 B2 | 8/2008 | Luo et al. | |
| 7,490,256 B2 | 2/2009 | Marshall et al. | |
| 7,509,504 B1 | 3/2009 | Koniaris et al. | |
| 7,574,613 B2 | 8/2009 | Holle et al. | |
| 7,725,749 B2 | 5/2010 | Mitarai | |
| 7,739,531 B1 | 6/2010 | Krishnan | |
| 7,886,164 B1 | 2/2011 | Alben et al. | |
| 8,370,663 B2 | 2/2013 | Frid et al. | |
| 2001/0033504 A1 | 10/2001 | Galbiati et al. | |
| 2001/0045779 A1 | 11/2001 | Lee et al. | |
| 2002/0002689 A1 | 1/2002 | Yeh | |
| 2002/0026597 A1 | 2/2002 | Dai et al. | |
| 2002/0029352 A1 | 3/2002 | Borkar et al. | |
| 2002/0032829 A1 | 3/2002 | Dalrymple | |
| 2002/0049920 A1 | 4/2002 | Staiger | |
| 2002/0073348 A1 | 6/2002 | Tani | |
| 2002/0083356 A1 | 6/2002 | Dai | |
| 2002/0087896 A1 | 7/2002 | Cline et al. | |
| 2002/0099964 A1 | 7/2002 | Zdravkovic | |
| 2002/0113622 A1 | 8/2002 | Tang | |
| 2002/0116650 A1 | 8/2002 | Halepete et al. | |
| 2002/0138778 A1 | 9/2002 | Cole et al. | |
| 2002/0178390 A1 | 11/2002 | Lee | |
| 2002/0194509 A1 | 12/2002 | Plante et al. | |
| 2003/0036876 A1 | 2/2003 | Fuller, III et al. | |
| 2003/0065960 A1 | 4/2003 | Rusu et al. | |
| 2003/0074591 A1 | 4/2003 | McClendon et al. | |
| 2003/0079151 A1 | 4/2003 | Bohrer et al. | |
| 2003/0110423 A1 | 6/2003 | Helms et al. | |
| 2003/0133621 A1 | 7/2003 | Fujii et al. | |
| 2003/0189465 A1 | 10/2003 | Abadeer et al. | |
| 2004/0025061 A1 | 2/2004 | Lawrence | |
| 2004/0032414 A1 | 2/2004 | Jain et al. | |
| 2004/0073821 A1 | 4/2004 | Naveh et al. | |
| 2004/0105237 A1 | 6/2004 | Hoover et al. | |
| 2004/0105327 A1 | 6/2004 | Tanno | |
| 2004/0123170 A1 | 6/2004 | Tschanz et al. | |
| 2004/0128631 A1 | 7/2004 | Ditzel et al. | |
| 2005/0007047 A1 | 1/2005 | Strothmann et al. | |
| 2005/0071705 A1 | 3/2005 | Bruno et al. | |
| 2005/0218871 A1 | 10/2005 | Kang et al. | |
| 2005/0268141 A1 | 12/2005 | Alben et al. | |
| 2005/0268189 A1 | 12/2005 | Soltis, Jr. | |
| 2005/0289367 A1 | 12/2005 | Clark et al. | |
| 2006/0074576 A1 | 4/2006 | Patel et al. | |
| 2006/0246895 A1 * | 11/2006 | Ryu | 455/434 |
| 2007/0220289 A1 | 9/2007 | Holle et al. | |
| 2007/0229054 A1 | 10/2007 | Dobberpuhl et al. | |
| 2007/0234088 A1 | 10/2007 | Marshall et al. | |
| 2007/0257710 A1 | 11/2007 | Mari et al. | |
| 2007/0296440 A1 | 12/2007 | Takamiya et al. | |
| 2008/0143372 A1 | 6/2008 | Koniaris et al. | |
| 2010/0318828 A1 | 12/2010 | Elting et al. | |

FOREIGN PATENT DOCUMENTS

| | | |
|---|---|---|
| EP | 0501655 | 9/1992 |
| EP | 0632360 | 1/1995 |
| EP | 0978781 | 2/2000 |
| EP | 1096360 | 5/2001 |
| EP | 1182538 | 2/2002 |
| EP | 1182556 | 2/2002 |
| EP | 1398639 | 3/2004 |
| GB | 2342471 | 4/2000 |
| GB | 2393540 | 3/2004 |
| GB | 2404792 | 2/2005 |
| JP | 409185589 | 7/1997 |
| JP | 10-187300 | 7/1998 |
| WO | 0127728 | 4/2001 |
| WO | 03079171 | 9/2003 |

OTHER PUBLICATIONS

Hong, I. et al.; Synthesis Techniques for Low-Power Hard Real-Time Systems on Variable Voltage Processors; Real-Time System Symposium Proceedings. Dec. 1998. Cited by other.

Hong, I. et al.; Power Optimization of Variable Voltage Core-Based Systems; Jun. 1998; Design Automation Conference Proceedings. Cited by other.

Mobile Pentium(R) III Processors—Enhanced Intel(R) SpeedStep(TM) Technology, http://support.inteL.comisupport/processorstmobile/pentiumiii/tti004.htm, Sep. 12, 2002, pp. 1-4.

Mobile Pentium(R) III Processors—Thermal Diode, http://supportintel.com/support/processors/mobile/pentiumiii/diode.htm, Sep. 12, 2002, pp. 1-2.

Mobile Pentium(R) III Processors—Thermal Management, http://supportintel.com/support/processorsimobile/pentiumiii/thermal.htm, Sep. 12, 2002, pp. 1-4.

Intel, Intel Pentium 4 Processor in the 423-pin Package, pp. 78-80, (Date believed prior to Nov. 14, 2002).

"Computer Software", Wikipedia, http://en.wikipedia.org/wiki/software, retrieved May 2, 2007.

"High Speed, Digitally Adjusted Stepdown Controllers for Notebook CPUS", Maxim Manual, pp. 11 & 21.

Alben, et al.; A Processor Speed Adjustment System and Method; U.S. Appl. No. 10/449,942, filed May 30, 2003.

Alben, et al.; A Processor Voltage Adjustment System and Method; U.S. Appl. No. 10/448,891, filed May 30, 2003.

Baker, K. et al.; "Wafer Burn-In Isolation Circuit" IBM Technical Disclosure Bulletin, IBM Corp., New York, US, vol. 32, No. 6B, Nov. 1, 1989, pp. 442-443, XP00073858 ISSN: 0018-8689, the whole document.

Baker, K. et al.; "Shmoo Plotting: The Black Art of IC Testing", IEEE Design and Test of Computers, IEEE vol. 14, No. 3; Jul. 1, 1997; pp. 90-97; XP000793305 ISSNL 0740-7475, the whole document.

Calavert, J.B., "The Phase-Locked Loop", Jul. 24, 2001, http://www.du.edu/.about.etuttle/electron/elect12.htm.

Grishman, Ralph; Lecture Notes, "Computer System Design-Spring 2002", "Lecture 2: Combinational Logic Design", 2002, Department of Computer Science, New York University.

Operation U (Refer to Functional Diagram), LTC 1736 Linear Technology Manual, p. 9.

(56) References Cited

OTHER PUBLICATIONS

Kelleher, et al.; A Processor Performance Adjustment System and Method; U.S. Appl. No. 10/295,619, filed Nov. 14, 2002.
Laplante, P. Comprehensive Dictionary of Electrical Engineering, CRC Press, IEEE Press, pp. 164-165.
Microsoft Technology Inc. Linear Voltage Fan Speed Control Using Microchips TC64X Family, pp. 1-4, 2003.
Migdal, et al.; "A Processor Temperature and Ode Adjustment System and Method", U.S. Appl. No. 10/295,748, filed Nov. 14, 2002.
Oner, H et al.; "A Compact Monitoring Circuit for Real-Time-On-Chip Diagnosis of Hot-Carrier Induced Degradation". Microelectronics Test Structures, 1997. ICMTS 1997. Proceedings, IEEE International Conference on Monterey, CA Mar. 17, 1993-Mar. 20, 1997, pp. 72-76.

* cited by examiner

POWER MANAGEMENT WITH DYNAMIC FREQUENCY ADJUSTMENTS

RELATED U.S. APPLICATION

This application is a continuation application of and claims priority to the patent application entitled "Power Management with Dynamic Frequency Adjustments," by Frid et al., with Ser. No. 12/029,375, filed Feb. 11, 2008, now U.S. Pat. No. 8,370,663, hereby incorporated by reference in its entirety.

FIELD

Embodiments according to the present invention generally relate to power management in limited-powered devices.

BACKGROUND

Power consumption is of particular concern to limited-power devices (e.g., battery-powered devices) such as laptop and notebook computer systems, cell phones, personal digital assistants (PDAs), portable media players, remote control units, hand-held devices including video game players, and the like. These devices are limited in size and weight and generally portable, and therefore they typically use smaller and lighter batteries of limited capacity. However, these types of devices may be used for a variety of computationally intensive and therefore power-hungry applications such as three-dimensional (3D) rendering and video encoding and decoding. As a result, such devices can usually be used only for relatively short periods of time before their batteries need to be recharged.

SUMMARY

Embodiments according to the present invention provide methods and systems for conserving power in limited-powered devices. In one embodiment, a central processing unit (CPU, e.g., a microprocessor) identifies a type of task to be performed and a device to perform that task. Based on the type of task and also on the device identified, the CPU selects an initial (or baseline) frequency for a clock signal to be used by the device(s) to perform the task. A baseline frequency can be predefined for each type of task, based on the known workload associated with each type of task. As such, the baseline frequency can be looked up by the CPU knowing the task to be performed.

The baseline frequency is a function of task and which device is used for the task. For example, a single task may be executed by two different devices. A different baseline frequency may be specified for each device. The discussion below describes the singular case but can be readily extended to cases involving multiple devices.

After selecting a device and setting the initial clock frequency, the CPU can enter a "reduced power mode." In general, the CPU's power is reduced to less than its normal power level. More specifically, the CPU may be "power gated" (e.g., turned off until it is needed). The selected device continues to execute the task using the baseline frequency after the CPU enters the reduced power mode.

If the clock frequency needs to be increased from the baseline frequency because the device is experiencing an increase in workload, the CPU can be awakened using an interrupt or the like. Once awakened, the CPU can dynamically adjust the frequency of the clock signal to track the actual workload of the device.

Before the CPU is awakened, the device can monitor its workload by monitoring relevant indicators. For example, buffer capacity can be monitored and the CPU awakened if remaining capacity falls below a predefined threshold. Once awakened, the CPU can measure, for example, the amount of time that the device is idle by counting the number of idle clock cycles. If the device's "idle time" decreases below a certain threshold, then the frequency of the clock signal can be increased adaptively; and if the idle time increases above that threshold (or a different threshold), then the frequency of the clock signal can be decreased adaptively. The clock frequency can be dynamically adjusted in this manner until it returns to the baseline frequency. Once the clock frequency is reduced back to its baseline frequency, the CPU can be returned to the reduced power mode.

In summary, once the baseline frequency is initially set by the CPU, the CPU can be powered down or turned off to save power. With the CPU in the reduced power mode, idle time is not monitored and clock frequency is not adjusted by the CPU. The CPU can be subsequently awakened in response to a triggering event that indicates that the frequency of the clock signal needs to be increased above the baseline. The CPU remains awake while the clock frequency is above the baseline, and idle time is monitored so that further adjustments to the clock frequency can be made if necessary. Once the workload decreases to a point where the clock frequency can be reset to the baseline frequency, the CPU can again be powered down or turned off and perhaps subsequently reawakened to repeat the process just described.

Thus, power is conserved on at least two fronts. First, power consumption is reduced because the CPU is not running continuously at full power—once the CPU selects a device and a baseline frequency, it can be powered down or turned off until it is needed. Second, the frequency of the clock signal used by the device is adjusted up and down depending on workload—because power usage is a function of clock frequency, the capability to scale frequency to workload means that power is used more efficiently. By intelligently selecting an appropriate baseline frequency and then adjusting it as needed, and by selectively running the CPU in the manner just described, a net savings in power is realized.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments in accordance with the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "performing," "adjusting," "setting," "specifying," "selecting," "entering," "interrupting," "awakening," "monitoring," "sending," "predicting," "increasing," "decreasing," "power gating," "operating," "returning," "monitoring," "comparing," "measuring" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Figure 1:
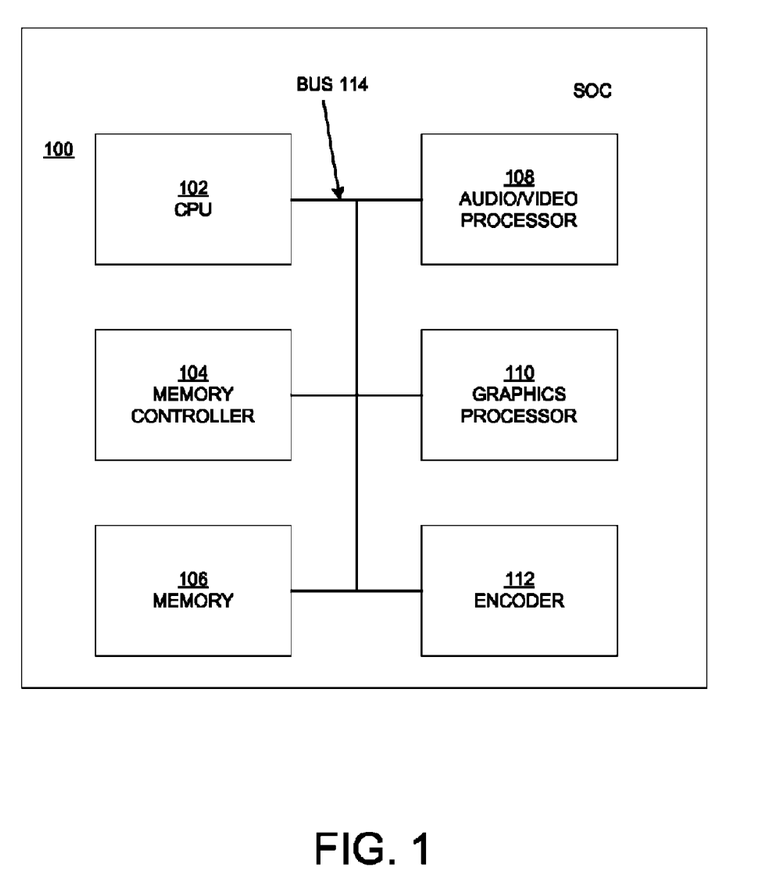
FIG. 1 is a block diagram showing an example of a computing system platform upon which embodiments according to the present invention may be implemented.

FIG. 1 is a block diagram showing an example of a computing system platform 100 upon which embodiments according to the present invention may be implemented. Embodiments in accordance with the present invention may be implemented on platforms that include functionality, components and devices other than those included in the system 100.

In the FIG. 1 embodiment, the system 100, which may be a battery-operated and/or portable device, includes a central processing unit (CPU) or microprocessor 102, a memory controller 104, a main memory 106, and audio/video processor (AVP) 108 (e.g., a multimedia player or decoder), a graphics (3D) processor 110, and an encoder 112. These elements are interconnected using one or more buses, exemplified by bus 114, such as an AMBA (Advanced Microprocessor Bus Architecture) High Speed Bus (AHB) and an AMBA Peripheral Bus (APB). Each of these elements, including the buses, may be driven using a different clock, although it is possible for different devices to be driven by the same clock. That is, a clock domain may include one or more devices.

In one embodiment, the system 100 is implemented as a system-on-a-chip (SOC). In such an embodiment, all of the blocks in the system 100, including memory, are inside the SOC.

Generally speaking, embodiments in accordance with the present invention can be implemented with multi-processor systems and/or multi-device SOCs.

In the present embodiment, the CPU 102 implements a power management technique that may be referred to as dynamic frequency scaling (DFS). In general, DFS provides a mechanism for adjusting the frequencies of the clock signals used by the devices in the system 100. Supply voltage may also be adjusted when frequency is adjusted—for example, if clock frequency is decreased, then supply voltage may be decreased as well. In general, lowering clock frequency and voltage saves power but can reduce performance.

DFS may also be implemented for the CPU 102—the clock frequency used by the CPU 102 may be adjusted up or down to conserve power, depending on the workload of the CPU.

DFS may be implemented using a centralized module that is constantly running. DFS is fundamentally run from the CPU 102 and by itself is consuming power. As will be described, DFS can be disabled under certain conditions. The CPU 102 may be running only for DFS. If so, and if DFS is disabled, then the CPU 102 can be placed in a "reduced power mode"—it may be powered down or turned off. In one embodiment, the CPU is "power gated." Power gating is a term of art and refers to a technique in which a device (e.g., the CPU 102) is temporarily turned off and then reactivated when it is needed. According to embodiments of the present invention, even if the CPU 102 is powered down or turned off, the activity of each of the devices in the system 100 is monitored. If device activity increases to a certain level, then the CPU 102 is awakened and the device is subject to DFS. These features are described in further detail in conjunction with the figures to follow.

Figure 2A:
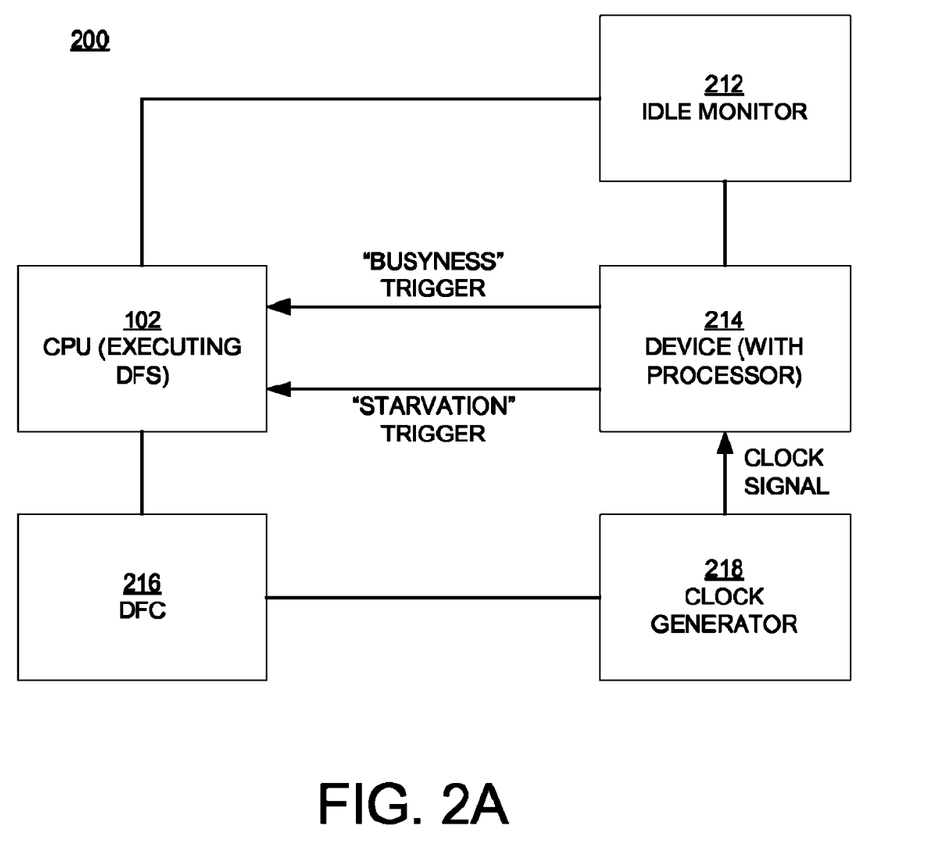
FIGS. 2A and 2B are a block diagrams showing embodiments of power management systems in accordance with the present invention.

FIG. 2A is a block diagram showing elements of a power management system 200 in one embodiment in accordance with the present invention. The system 200 includes a device 214, which may be one of the devices mentioned in connection with FIG. 1. The device 214 executes one or more software applications that in turn execute one or more tasks.

The device 214 uses a clock signal generated by a clock generator 218. The frequency of the clock signal generated by the clock generator 218 is dynamic—it can be changed (increased or decreased) over time. In the example of FIG. 2A, the frequency of the clock signal is controlled by a dynamic frequency counter or controller (DFC) 216.

Figure 2B:
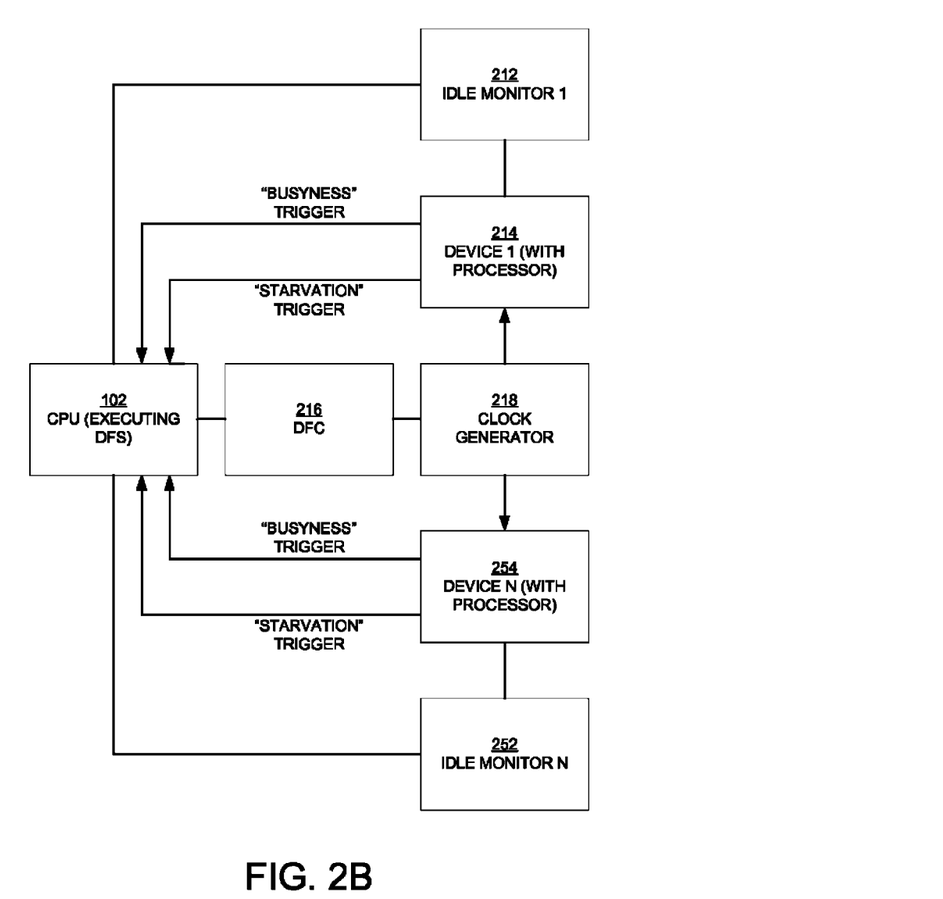

FIG. 2A shows only a single device 214. However, as shown in FIG. 2B, there may be multiple devices (device 1 214, . . . , device N 254), such as the devices mentioned above in conjunction with FIG. 1, and each of those devices may be inside an SOC as shown in FIG. 1. Each device 1, . . . , N can have its own processor and its own idle monitor 1 212, . . . , N 252, respectively, which may be a hardware element or may be running in software, either on the device itself or on the CPU 102. Also, each device 1, . . . , N can generate its own "starvation" and "busyness" triggers, which are described below.

Furthermore, in one embodiment, each device can receive a different clock signal from the clock generator 218—in general, each device 1, . . . , N can have its own clock, and a different clock frequency can be specified for each device. Different tasks can be executed on different devices, with some tasks limited to a subset of all of the devices. Also, a single task may be executed by two different devices.

Thus, the activity (e.g., amount of idle time) for each device 1, . . . , N can be individually monitored using the idle monitors 1, . . . , N, respectively. As will be seen from the discussion below, the clock frequency used by each device 1, . . . , N can be individually adjusted for DFS. Furthermore, as will be seen from the discussion below, DFS can be conditionally disabled.

For reasons of clarity, the following discussion refers to a single device 214. However, the discussion can be readily extended to multiple devices, perhaps operating in parallel, and perhaps operating on the same task or on different tasks.

With reference to FIG. 2A, an initial (baseline) frequency is specified by the CPU 102, depending on the type of task or use case to be executed by the device 214 at any time. The baseline frequency is a function of task and which device is used for the task. If multiple devices are performing the same task, a different baseline frequency may be specified for each device.

Significantly, after setting the baseline frequency initially, the CPU 102 can enter a reduced power mode until it is interrupted or otherwise needed (e.g., to adjust the frequency of the clock signal, as will be described). In the reduced power mode, the CPU 102 can be powered down or turned off. In one embodiment, the CPU 102 is power gated. In essence, the CPU 102 can be switched off while other devices continue to be powered. For example, the CPU 102 may have its own power domain and hence may be powered by an external power supply.

Thus, once the CPU 102 specifies an initial (or baseline) clock frequency for the device 214 based on the identified task, it enters an inactive (e.g., "sleep") mode. The device 214 executes the task using the baseline frequency after the CPU 102 enters the reduced power mode.

If the baseline frequency needs to be increased because the performance level associated with the baseline frequency is not adequate to perform the task in a manner required or desired, the CPU 102 can be awakened using an interrupt that is issued by the device 214 in response to a triggering event. Triggering events are generally categorized herein as "starvation" triggers and "busyness" triggers. Triggering events may also be referred to as real-time events.

An example of a starvation trigger is buffer fullness. In general, a certain amount of buffer capacity (e.g., a certain number of buffers) is associated with the device 214. It is generally desirable to fill the buffers to a certain level but not completely, so that the buffers do not overflow yet the device 214 will not be starved for data when data is needed. This is particularly true for tasks that involve decoding or processing audio and/or video data for real-time rendering. In one embodiment, the device 214 sends an interrupt to the CPU 102 if a measure of buffer capacity fails to satisfy a predefined threshold. For example, if remaining buffer capacity falls below the predefined threshold, then an interrupt is generated. In response to the interrupt, the CPU 102 awakens so that it can specify a new (higher) frequency for the clock generator 218, thereby increasing the performance of the device 214. Different devices may have different thresholds—each device can have its own threshold for detecting real time starvation. Also, the buffer capacity threshold may depend on the type of task—for a given device, different thresholds may be set for different tasks.

An example of a busyness trigger is a predicted change in workload for the device 214. For example, the device 214 may be executing a particular task when the device driver identifies a pending task that is more computationally intensive then the currently executing task. In one embodiment, the device 214 sends an interrupt to the CPU 102 if the device predicts an increase in its workload. In response to the interrupt, the CPU 102 awakens so that it can specify a new (higher) frequency for the clock generator 218.

Once awakened, the CPU 102 stays awake so that it can continue to dynamically adjust the frequency of the clock signal according to the time-dependent workload of the device 214. Based on the measured idleness of the device, the frequency may be increased or decreased. Supply voltage may also be adjusted when frequency is adjusted—for example, if clock frequency is decreased, then supply voltage may be decreased as well. If the clock frequency is subsequently reset to the baseline frequency, then the CPU 102 can re-enter the reduced power mode.

The embodiment of FIG. 2A includes an idle monitor 212, which may be implemented in hardware and/or software. In general, the idle monitor 212 measures the amount of time that the device 214 is idle. A similar idle monitor may be associated with each device and bus in the system 100. In one embodiment, the idle monitor 212 counts the number of clock cycles that the device 214 is idle during each sample interval. In one embodiment, an average count is determined for a moving window of time. That is, the number of idle clock cycles is counted over a first sample interval, a second sample interval, and so on, up to N consecutive sample intervals. The counts for the set of 1 to N sample intervals are then averaged to determine the amount of idle time for a first window of time. The count for the first sample interval is removed from the set and replaced with the count for the $(N+1)^{th}$ sample interval, and the counts for the set of 2 to (N+1) sample intervals are averaged to determine the amount of idle time for a second window of time, and so on.

In one embodiment, the length of the sample intervals depends on clock frequency—if clock frequency is reduced, the length of the sample intervals is increased. Extending the length of the sample intervals reduces power consumption.

For a given workload, the amount of idle time is a function of clock frequency—increasing the clock frequency increases idle time, and decreasing the clock frequency decreases idle time. Zero idle time is ideal, but in actual practice maintaining zero idle time may not be desirable because there may not be enough time to respond to sudden changes in workload. Consequently, an acceptable amount of idle time is defined and used as a threshold value against which the measured amount of idle time can be compared. If the measured amount of idle time is less than the threshold value, then the clock frequency can be increased. Too little idle time may be referred to as non-real time starvation. If the measured amount of idle time is above the threshold value, then the clock frequency can be decreased. Power consumption is a function of clock frequency, and so power can be conserved by decreasing the clock frequency when it is acceptable to do so. Different threshold values may be specified for different devices—each device can have its own threshold for detecting non-real time starvation. Also, the idleness threshold may depend on the type of task—for a given device, different thresholds may be set for different tasks.

Thus, in general, the value of a selected metric (e.g., idle time) is monitored, and if that metric fails to satisfy a condition (e.g., it is too high or too low in comparison to a threshold value) then the frequency of the clock signal generated by the clock generator 218 is adjusted (decreased or increased, respectively) by the CPU 102. Supply voltage may also be adjusted when frequency is adjusted.

Two threshold values may be used instead of a single threshold: one threshold can be used to determine whether idle time is too high; the other threshold can be used to determine whether idle time is too low; and if the amount of idle time falls between the two thresholds, then the clock frequency is maintained at its current value.

Figure 3:
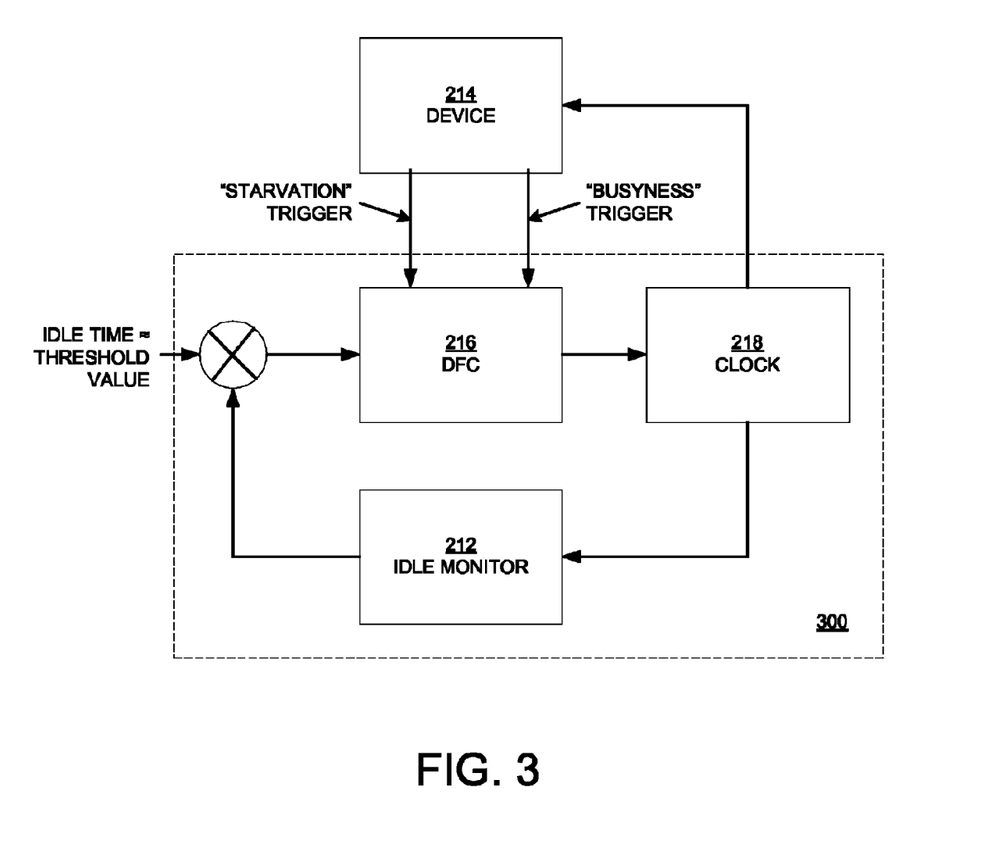
FIG. 3 is a block diagram representing a clock signal frequency adjustment loop in one embodiment in accordance with the present invention.

FIG. 3 is a representation of a clock signal frequency adjustment loop 300 in one embodiment in accordance with the present invention. The loop 300 is implemented using the system 200 of FIG. 2A. A feedback loop such as the loop 300 can be implemented in parallel for each device in the system 100 of FIG. 1. That is, there are multiple loops such as the loop 300 running on the CPU 102 for the multiple devices, including a loop for the CPU 102 itself. According to embodiments of the present invention, the loop 300 is used to control and adjust clock frequency only if the CPU 102 is awake; otherwise, the device performing the task uses the baseline frequency. When the CPU 102 is not awake, an interrupt (in response to a triggering event) sent from that device activates the loop 300.

With reference to FIG. 3, the DFC 216, responsive to the CPU 102, controls the frequency of the clock signal generated by the clock generator 218. A device (e.g., the device 214 of FIG. 2A) in the clock domain of the clock generator 218 uses the clock signal to perform a task that is part of an application. The idle monitor 212 measures the degree of idleness of the device, which is compared to the appropriate threshold in the manner described above, resulting in adjustment of the clock frequency, if necessary, to maintain the threshold amount of idleness. Furthermore, the clock frequency can be adjusted in response to a triggering event identified by the device's driver, the application or the task, as described above. Supply voltage may also be adjusted when frequency is adjusted.

For clarity, the discussion of FIGS. 4 and 5 below may imply the use of a single loop 300. However, as noted above, there can be multiple such loops implemented in parallel for each device in the system 100.

Figure 4:
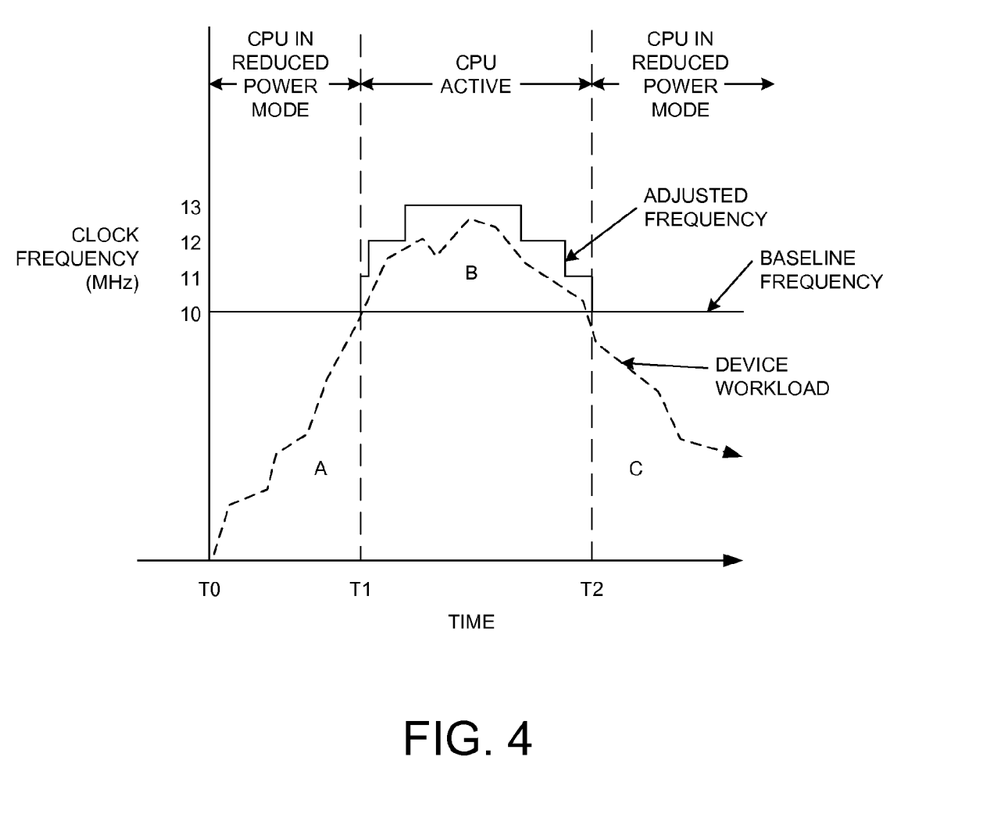
FIG. 4 is a diagram showing clock signal frequency and workload versus time in one embodiment in accordance with the present invention.

FIG. 4 is a diagram showing clock signal frequency and device workload versus time in one embodiment in accordance with the present invention. Prior to time T0, the CPU 102 identifies a task to be performed, identifies which device or devices are needed to perform the task, and sets a baseline frequency for each device (or for each clock domain that includes the identified device(s)). Devices not needed to perform the task may be power gated.

In the example of FIG. 4, a baseline frequency of 10 MHz is specified for the task at hand for one of the devices (e.g., the device 214 of FIG. 2A). Different baseline frequencies can be specified per task (or per use case) and per device (or per clock domain). The baseline frequencies per task or use case, and per device or clock domain, can be implemented using lookup tables, for example.

In region A, from time T0 to time T1, the CPU 102 is placed in a reduced power mode. That is, depending on the implementation, the CPU 102 may be powered down to a reduced power level or turned off completely (e.g., power gated).

In FIG. 4, one of the lines is labeled "device workload." The workload line is not an actual measure of workload. In a sense, the workload line in FIG. 4 can be interpreted as the clock frequency that, if used, would result in the threshold amount of idle time (as described above, although zero idle time is ideal, in actual practice some idle time is permitted and a threshold value is defined accordingly). In general, the workload changes over time; in regions A and C, the baseline frequency is high enough to accommodate the workload in those regions; and in region B, the baseline frequency is adjusted to generally track the workload.

The workload on the device 214 need not be measured directly, although it may be. It is not necessarily important to precisely quantify the workload; instead, it is important to be able to identify when the workload has increased to the point where the baseline frequency has to be increased. This is accomplished using a starvation or busyness trigger as described above.

In region A, although the task at hand could in theory be accomplished at less than the baseline frequency, the clock frequency used by the device 214 is not reduced to less than the baseline frequency. Therefore, in region A, the device 214 may be operating using a higher clock frequency than needed, and thus may be consuming more power than required. However, as noted above, in region A the CPU 102 is in a reduced power state and may even be turned off. By intelligently selecting the baseline frequency, any power "lost" by driving the device 214 at a clock frequency higher than what may be needed is offset by the power savings that result from powering down or turning off the CPU 102. Thus, in region A (as well as in region C), net power consumption is reduced.

In the example of FIG. 4, a triggering event occurs at time T1. For example, a measure of remaining buffer capacity might fail to satisfy a corresponding threshold, or an increase in workload may be predicted. As a result of the triggering event, an interrupt is generated in order to wake up the CPU 102. In response to the interrupt, the CPU 102 increases the baseline clock frequency by a predetermined amount in order to accommodate the anticipated increase in workload. In the example of FIG. 4, at time T1, the clock frequency is increased to 11 MHz. The point at which the CPU 102 is awakened and the clock frequency is increased may be referred to as a "corner," and more specifically as a "high corner."

In region B, the CPU 102 is awake. Idle time of the device 214 is monitored and the clock frequency is adjusted accordingly as described in conjunction with FIGS. 2 and 3 above. In one embodiment, to determine idle time, a count is made of the number of clock cycles that the device 214 is idle over one or more sample intervals. The amount of idle time may be an average value of measurements taken over a moving window of some number of consecutive intervals. Periodically, e.g., each time an average measured value is determined, the measured amount of idle time is compared to a threshold or thresholds. If a single threshold is used and the measured amount of idle time is too high, then the clock frequency is decreased; otherwise, the clock frequency is further increased by, for example, a predetermined amount (e.g., another 1 MHz increment). If two thresholds are used, then the clock frequency can be decreased if the measured amount of idle time is too high; increased if the measured amount of idle time is too low; or kept at its current value if the measured amount of idle time is between the two thresholds.

In the example of FIG. 4, at time T2, the clock frequency is reset to the baseline value. That is, at time T2, the device's workload has decreased, and the amount of idle time has commensurately increased, to the point where the clock frequency can again be set to the baseline value. Upon setting the clock frequency to the baseline value, the CPU 102 can again be placed in the reduced power mode. The point at which the clock frequency is reset to the baseline value and the CPU 102 returned to the reduced power mode may be referred to as a "low corner."

In summary, in regions A and C, the CPU 102 is in a reduced power mode, a metric such as idle time is not measured, and clock frequency is not adjusted. In region B, the CPU 102 is active, idle time is measured, and clock frequency is adjusted. Supply voltage may also be adjusted when frequency is adjusted. In regions A and C, triggering events are used to awaken the CPU 102—in a sense, the triggering events provide early warning of the need to initially increase and subsequently adjust clock frequency based on workload.

In other words, DFS is disabled in regions A and C but enabled in region B. When DFS is disabled, triggering events are relied upon to identify that DFS needs to be enabled. In regions A and C, when the workload is accomplished by the device 214, the CPU 102 has very little or no work to do. In some instances, the only reason the CPU 102 would be active is to perform DFS. Whether implemented in hardware or software, the idle monitor 212 (FIG. 2A), and any other elements associated with the implementation of DFS, will consume power when DFS is enabled. Disabling DFS and powering down or turning off the CPU 102 means that the idle monitor 212 can also be shut down.

Figure 5:
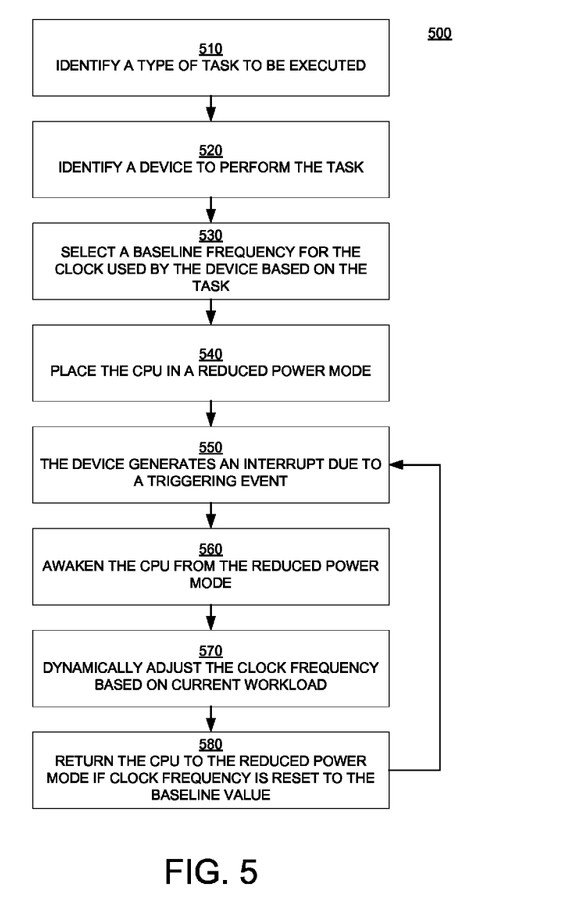
FIG. 5 is a flowchart of a computer-implemented power management method in one embodiment in accordance with the present invention.

FIG. 5 is a flowchart 500 of computer-implemented power management methods in accordance with embodiments of the present invention. Although specific steps are disclosed in the flowchart 500, such steps are exemplary. That is, embodiments of the present invention are well-suited to performing various other steps or variations of the steps recited in the flowchart 500.

Blocks 510, 520 and 530 are performed with the CPU 102 (FIG. 1) in its normal or active power mode. In block 510, the type of task (or use case) to be performed is identified. In block 520, the device or device(s)—or their respective clock domain(s)—that will perform the task are identified. In block 530, a baseline frequency specific to both the task and the device is selected, and the device is instructed to begin the task. The CPU 102 can also specify a buffer capacity threshold and/or an idleness threshold for the device. The buffer capacity threshold and the idleness threshold may also be specific to the type of task.

In block 540, the CPU 102 enters a reduced power mode (e.g., it is powered down or turned off). In one embodiment, the CPU 102 is power gated.

In block 550, while the device is performing the task using the baseline clock frequency, an interrupt is generated as a result of a triggering event (e.g., a starvation event or a busyness event), described above.

In block 560, the CPU 102 is awakened in response to the interrupt of block 550. That is, the CPU 102 exits the reduced power mode and returns to its normal power mode.

In block 570, the CPU 102 implements DFS. In other words, the CPU 102 adjusts (scales) clock frequency according to the current workload of the device. Supply voltage may also be adjusted when frequency is adjusted. In one embodiment, the amount of idle time is used as a measure of workload. If the amount of time that the device is idle is greater than a corresponding threshold, then the CPU 102 decreases the clock frequency. If the amount of time that the device is idle is less than a corresponding threshold, then the CPU 102 increases the clock frequency. The clock frequency used by the device may also be kept at its current value.

In block 580, if the clock frequency is reset to the baseline frequency, then the CPU 102 re-enters the reduced power mode. That is, if the workload is reduced to a low enough level, then DFS can be disabled and the CPU 102 can be powered down or turned off (e.g., power gated). Blocks 540 through 580 can be repeated until the task is completed.

In summary, embodiments according to the present invention provide methods and systems for conserving power. Such systems and methods are particularly useful in limited-power devices such as battery-powered devices. Power is conserved on at least two fronts. First, power consumption is reduced because the CPU is not running continuously at full power—once the CPU selects a device and a baseline frequency, it can be powered down or turned off until it is needed. Second, the frequency of the clock signal used by the device is adjusted up and down depending on workload—because power usage is a function of clock frequency, the capability to scale frequency to workload means that power is used more efficiently. Supply voltage may also be adjusted when frequency is adjusted. By intelligently selecting an appropriate baseline frequency and then adjusting it as needed, and by selectively running the CPU to implement DFS, a net savings in power is realized. As a result, limited-power devices can be used for longer periods of time and, for a given workload, batteries can be recharged less frequently.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system comprising:
a device operable for executing a task; and
a processor coupled to said device, wherein said processor specifies a value for a frequency for a clock signal used by said device and thereafter said processor is placed in a reduced power mode; wherein said device is operable to perform said task after said processor is placed in said reduced power mode until a triggering event causes said device to send an interrupt to said processor; wherein in response to said interrupt said processor awakens to dynamically adjust said frequency of said clock signal so that a metric satisfies a first condition.

2. The system of claim 1 wherein said interrupt is sent based on a measure of buffer capacity of a buffer associated with said device.

3. The system of claim 1 wherein said interrupt is sent if a measure of workload is predicted to change during execution of said task.

4. The system of claim 1 wherein said metric is based on an amount of time said device is idle while said task is executed.

5. The system of claim 4 wherein said processor increases said value of said frequency of said clock signal if said metric is less than a corresponding threshold value and decreases said value for said frequency for said clock signal if said metric is more than a corresponding threshold value.

6. The system of claim 4 wherein said amount of time is measured over a sample interval, wherein said sample interval is extended in length if said value for said frequency of said clock signal is reduced.

7. The system of claim 1 wherein said value for said frequency of said clock signal is specified according to a type of said task.

8. The system of claim 1 wherein reduced power mode comprises power gating said processor.

9. A method comprising:
operating a processor in a first power mode;
in response to a selection of a device to perform a task and a selection of a value for a frequency for a clock used by said device, entering a reduced power mode at said processor, wherein said frequency of said clock remains set to said value until a triggering event occurs;
awakening said processor in response to an interrupt generated by said device so that said processor can dynamically adjust said value for said frequency of said clock.

10. The method of claim 9 further comprising:
monitoring a measure of buffer capacity associated with said device; and
sending said interrupt if said measure is less than a threshold.

11. The method of claim 9 further comprising sending said interrupt if an increase in workload associated with performing said task is predicted.

12. The method of claim 9 further comprising:
with said processor in said first operating mode subsequent to said awakening, monitoring a metric that corresponds to an amount of time said device is idle while performing said task;
increasing said value of said frequency for said clock if said metric is less than a corresponding threshold value; and
decreasing said value of said frequency for said clock if said metric is greater than a corresponding threshold value.

13. The method of claim 9 wherein said selection of said value for said frequency for said clock depends on a type of said task.

14. The method of claim 9 further comprising power gating said processor in said reduced power mode.

15. A system comprising:
a processor; and
a device coupled to said processor, wherein said processor specifies a value for a baseline clock frequency for said device and then enters a reduced power mode, wherein said device executes tasks using said value for said baseline clock frequency and awakens said processor from said reduced power mode if said value for said baseline clock frequency is to be changed.

16. The system of claim 15 wherein said value for said baseline clock frequency is to be changed in response to a triggering event selected from the group consisting of: buffer capacity of said device does not satisfy a threshold value; workload of said device is predicted to change; and amount of time said device is idle does not satisfy a threshold value.

17. The system of claim 15 wherein said device sends an interrupt to said processor to awaken said processor.

18. The system of claim 15 wherein, after said processor awakens, said processor adjusts said value for said baseline clock frequency and then returns to said reduced power mode.

19. The system of claim 15 wherein a respective value for said baseline frequency is predefined for each of said tasks, wherein said value for said baseline frequency is looked up by said processor knowing said tasks to be performed.

20. The system of claim 15 further comprising a second device coupled to said processor, wherein said processor specifies a second value for a second baseline clock frequency for said second device before entering said reduced power mode, wherein said second device executes tasks using said second value for said second baseline clock frequency and awakens said processor from said reduced power mode if said second value for said second baseline clock frequency is to be changed.

* * * * *